(12) United States Patent
Mittelstadt et al.

(10) Patent No.: US 6,490,465 B1
(45) Date of Patent: Dec. 3, 2002

(54) MOBILE TELEPHONE STATUS MENU WITH ANTENNA POSITION INDICATION

(75) Inventors: David J. Mittelstadt, Boulder, CO (US); Jon D. Slater, Boulder, CO (US); Gayathri Chittiappa, Boulder, CO (US); Shawn C. Morrison, Boulder, CO (US); Steve C. DeTar, Longmont, CO (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/392,490

(22) Filed: Sep. 9, 1999

(51) Int. Cl.[7] .......................... H04B 17/00; H01Q 1/24
(52) U.S. Cl. ........................ 455/566; 455/90; 455/67.7; 455/423; 343/702
(58) Field of Search ................................ 455/566, 405, 455/410, 411, 423, 38.4, 67.7, 556, 557, 569, 90, 575, 565, 67.1; 343/702, 760, 894, 906

(56) References Cited

U.S. PATENT DOCUMENTS

| | | | | |
|---|---|---|---|---|
| 5,587,717 A | * | 12/1996 | Jang | 455/566 |
| 5,754,962 A | * | 5/1998 | Griffin | 455/569 |
| 5,870,683 A | * | 2/1999 | Wells et al. | 455/566 |
| 5,892,447 A | * | 4/1999 | Wilkinson | 340/573.4 |
| 6,104,304 A | * | 8/2000 | Clark et al. | 340/664 |
| 6,148,180 A | * | 11/2000 | Sato | 455/67.7 |
| 6,151,677 A | * | 11/2000 | Walter et al. | 713/183 |
| 6,195,569 B1 | * | 2/2001 | Frederiksen | 455/566 |
| 6,211,858 B1 | * | 4/2001 | Moon et al. | 345/146 |
| 6,239,787 B1 | * | 5/2001 | Sugaya | 345/169 |
| 6,297,778 B1 | * | 10/2001 | Phillips et al. | 343/702 |

OTHER PUBLICATIONS

NOKIA, Nokia 6160 Owner's Manual, Nokia Mobile Phones, Inc. (Canada).

* cited by examiner

*Primary Examiner*—Nguyen T. Vo
*Assistant Examiner*—Duc Nguyen
(74) *Attorney, Agent, or Firm*—Philip R. Wadsworth; Gregory D. Ogrod

(57) ABSTRACT

A mobile telephone displays a status menu on a mobile telephone display. The status menu includes an antenna position status that indicates if an antenna for the mobile telephone is properly positioned. The mobile telephone continually updates the antenna position status in the status menu when the status menu is displayed.

16 Claims, 3 Drawing Sheets

FIG. 1 - PRIOR ART

MOBILE TELEPHONE STATUS MENU WITH ANTENNA POSITION INDICATION

BACKGROUND OF THE INVENTION

I. Field of the Invention

The present invention relates to the field of mobile telephones. More particularly, the present invention relates to a novel and improved mobile telephone that displays a status menu that indicates if the antenna is positioned properly.

II. Description of the Related Art

FIG. 1 illustrates the configuration and operation of a mobile telephone in the prior art. FIG. 1 is a block diagram that depicts a conventional mobile telephone 100. The mobile telephone 100 includes display 101, dialing buttons 102, menu scroll control 103, menu select control 104, control circuitry 105, and antenna 106. The control circuitry 105 includes menu logic 111 and status logic 112. Those skilled in the art will appreciate that FIG. 1 is simplified for clarity, and some conventional components are omitted. Those skilled in the art will also understand that FIG. 1 is a logical view of the control circuitry 105. The control circuitry 105 is implemented using processors, memory, software, control lines, and other conventional circuitry.

The menu logic 111 controls the display 101 to display menus 113. The menu logic 111 operates in response to control signals from dialing buttons 102, the menu scroll control 103, and the menu select control 104. The user navigates through the menus 113 to control the configuration and operation of the mobile telephone 100.

The status logic 112 controls the display 101 to display status information 114. The status information 114 indicates the operational status for various aspects of the mobile telephone 100, such as signal strength, battery power, voice mail, call-in-progress, available service, and type of service. Unfortunately, there is no status menu that effectively conveys the status of the antenna position and other aspects of the mobile telephone 100.

SUMMARY OF THE INVENTION

The present invention includes a novel and improved mobile telephone that displays a status menu to indicate if its antenna is properly positioned. Advantageously, the user can simply re-position the antenna until the antenna position status in the status menu changes to a positive indicator on the status menu.

A mobile telephone displays a status menu on a mobile telephone display. The status menu includes an antenna position status that indicates if an antenna for the mobile telephone is properly positioned. The mobile telephone continually updates the antenna position status in the status menu when the status menu is displayed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

II. Description of the Related Art

Figure 1:
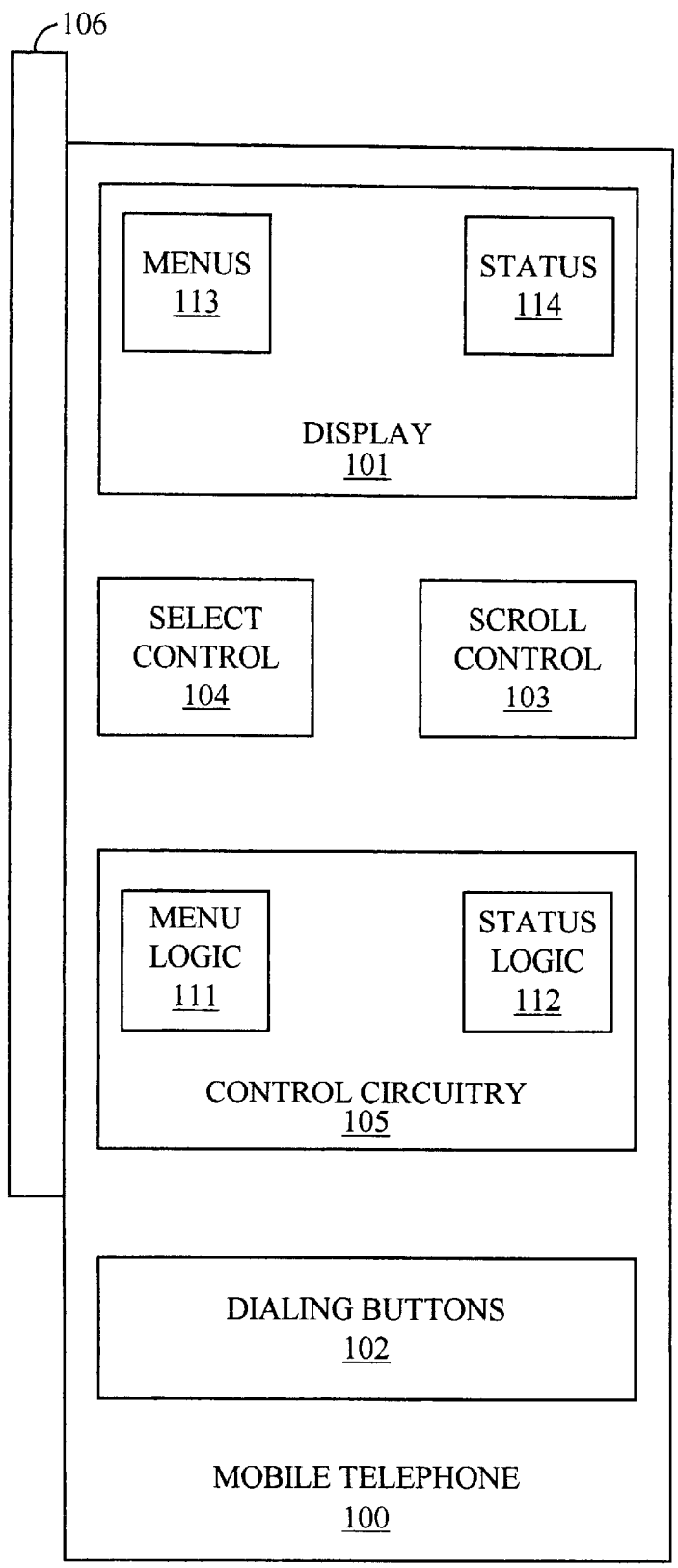
FIG. 1 is a block diagram of a mobile telephone in the prior art.
Figure 2:
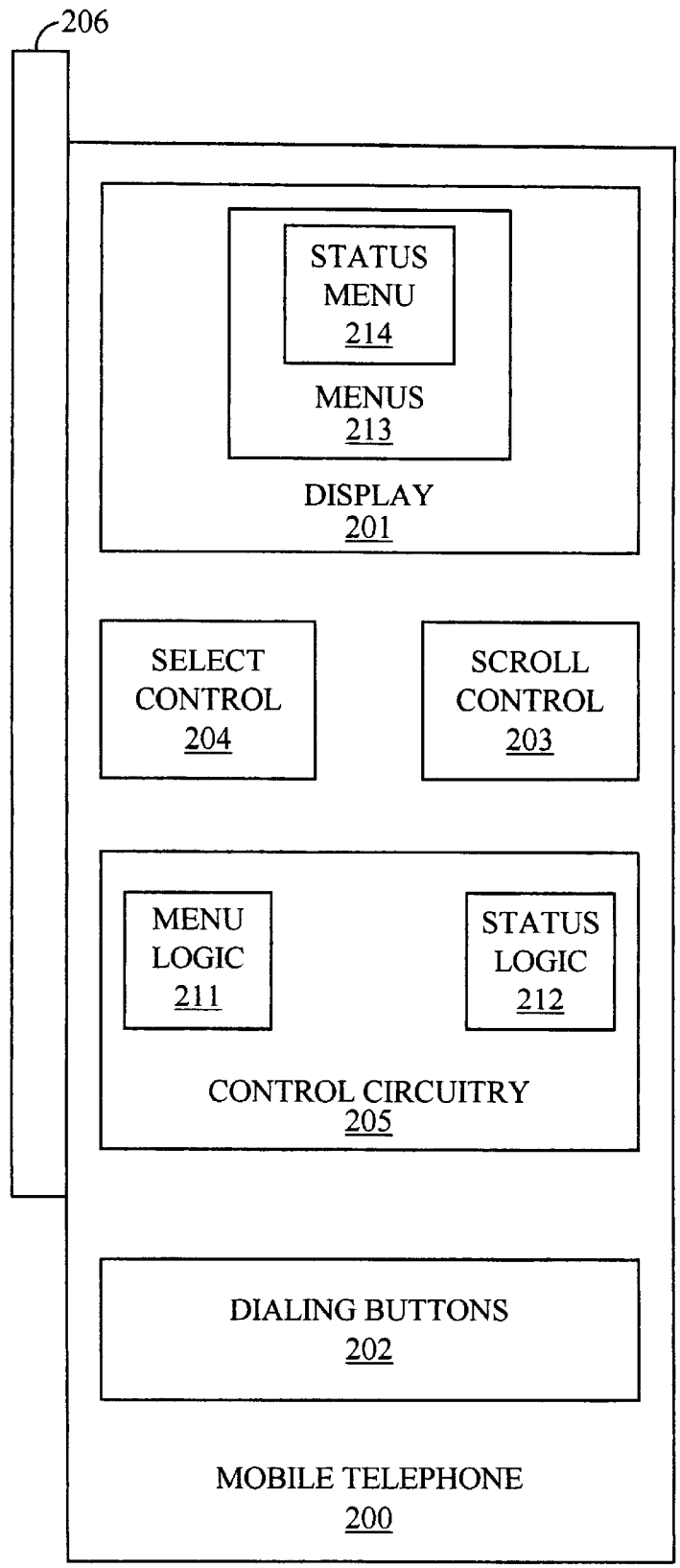
FIG. 2 is a block diagram of a mobile telephone in an example of the invention.
Figure 3:
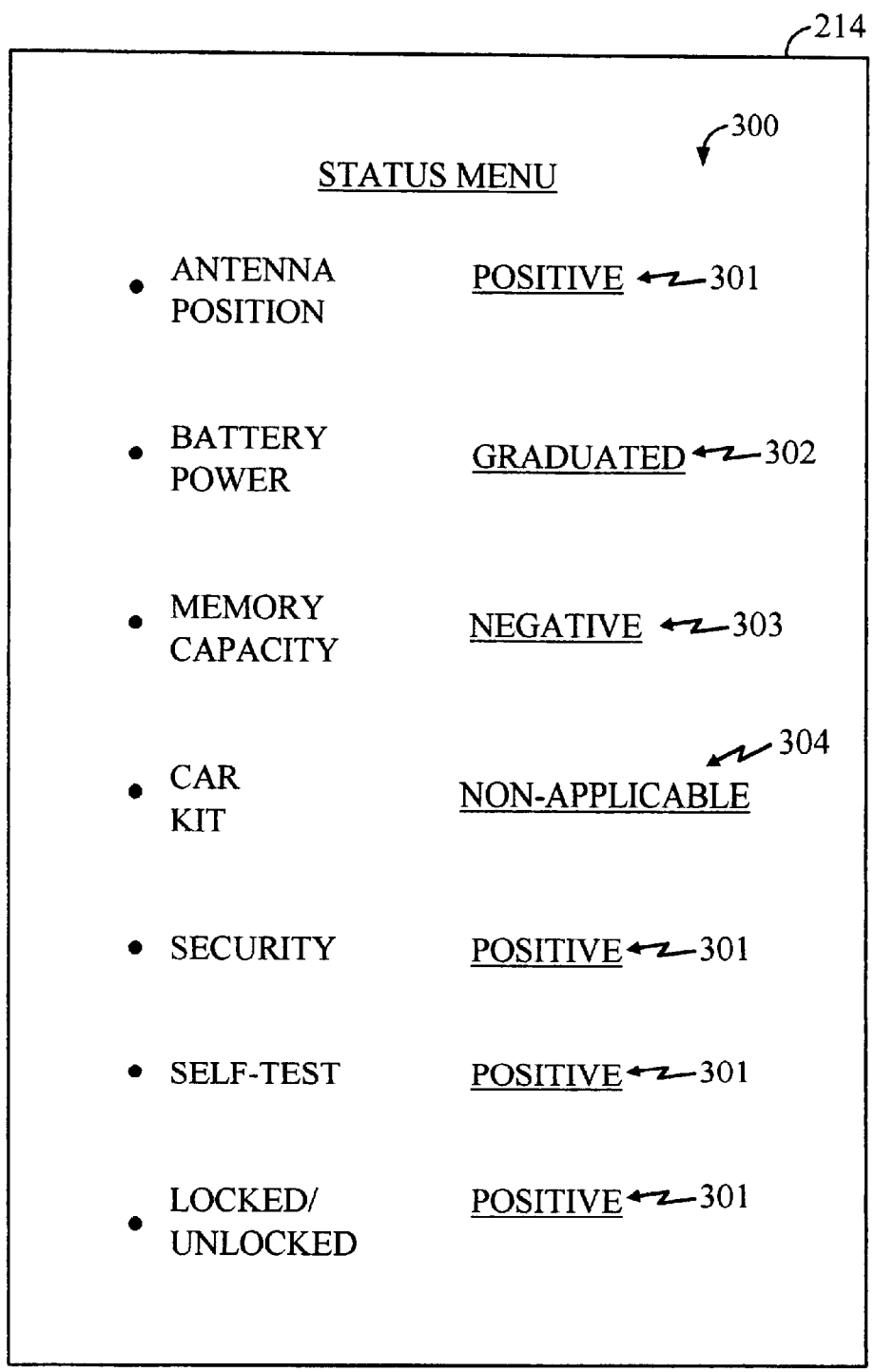
FIG. 3 is a block diagram of a status menu in an example of the invention.

FIGS. 2–3 illustrate the configuration and operation of a mobile telephone in an example of the invention. FIG. 2 is a block diagram that depicts a mobile telephone 200. The mobile telephone 200 includes display 201, dialing buttons 202, menu scroll control 203, menu select control 204, control circuitry 205, and antenna 206. The control circuitry 205 includes menu logic 211 and status logic 212. Those skilled in the art will appreciate that FIG. 2 is simplified for clarity, and some conventional components are omitted. Those skilled in the art will also understand that FIG. 2 is a logical view of the control circuitry 205. The control circuitry 205 is implemented using processors, memory, software, control lines, and other conventional circuitry.

The menu logic 211 controls the display 201 to display menus 213. The menu logic 211 operates in response to control signals from dialing buttons 202, the menu scroll control 203, and the menu select control 204. The user navigates through the menus 213 to control the configuration and operation of the mobile telephone 200. The status logic 212 provides information to the menu logic 211 regarding the operational status for various aspects of the mobile telephone 200. The menu logic 211 controls the display 201 to display a status menu 214.

FIG. 3 is a block diagram of the status menu 214 in an example of the invention. The status menu 214 displays an operational status indicator 300 that indicates the operational status for various aspects of the mobile telephone 200. Some examples of the operational status indicator include but are not limited to a positive indicator 301, a negative indicator 303, a non-applicable indicator 304, or graduated indicator 302 such as commonly used to indicate battery life. Some examples of the positive indicator 301 could be a happy face icon or any alphanumeric message such as "OK." Some examples of the negative indicator 303 could be a frowning faced icon or any alphanumeric message such as "Low." Some examples of a non-applicable indicator 304 could be a solid line, dashed line, or any alphanumeric display such as "N/A."

The status menu 214 includes status for antenna position, battery power, memory capacity, car kit, security, self-test, and system locked/unlocked. The battery power status indicates available battery power. The memory capacity status indicates available memory capacity. The car kit status indicates the successful or unsuccessful operation of mobile telephone peripheral equipment in an automobile. The security status indicates the status of the mobile telephone security. The self-test status indicates the positive or negative result for a hardware validation and verification test. The system locked/unlocked status indicates if the mobile telephone is in a locked or unlocked condition.

The status logic 212 determines if the antenna 206 is properly positioned based on the physical position of the antenna 206. When the user accesses the status menu 214, the status logic 212 interacts with the menu logic 211 to continually update the antenna position status so the user can re-position the antenna 216 until the antenna position status changes to a positive indicator, such as "OK".

In some embodiments of the invention, the mobile telephone of the present invention is configured to communicate with satellites systems and in other embodiments the mobile telephone of the present invention is configured to communicate with terrestrial systems. The position of the antenna 206 is especially important if the mobile telephone of the present invention communicates with satellite systems.

Some satellite systems use code division multiple access (CDMA) spread spectrum signals as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

Related commonly owned applications also incorporated herein by reference are application Ser. No. 08/723,722, entitled "Position Determination Using One Low-Earth Orbit Satellite," application Ser. No. 08/723,722, entitled "Passive Position Determination Using Two Low-Earth Orbit Satellite," application Ser. No. 08/723,725, entitled "Unambiguous Position Determination Using Two Low-Earth Orbit Satellites," and application Ser. No. 08/723,723 entitled "Ambiguity Resolution for Ambiguous Position Solutions Using Satellite Beams."

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for operating a mobile telephone in communication with a mobile telephone system, the method comprising:

simultaneously displaying on a mobile telephone display: an antenna position status that indicates, given the physical location in which the mobile telephone is located, if an antenna for the mobile telephone is properly positioned based upon the physical position of the antenna relative to the mobile telephone system; a battery power indicator; and the results of a mobile telephone self-test;

repositioning said mobile telephone when said antenna position status is negative and said batter power indicator and said mobile telephone self-test are positive; and continually updating said antenna position status when said antenna position status is displayed.

2. The method of claim 1 wherein said displaying further comprises displaying memory capacity status.

3. The method of claim 1 wherein said displaying further comprises displaying car kit status.

4. The method of claim 1 wherein said displaying further comprises displaying security status.

5. The method of claim 1 wherein said displaying further comprises displaying a locked/unlocked status.

6. The method of claim 1 wherein the mobile telephone is configured to communicate with satellites using the antenna.

7. The method of claim 6 wherein the mobile telephone is configured to communicate using code division multiple access spread spectrum signaling.

8. A mobile telephone in communication with a mobile telephone system comprising:

a display;

an antenna; and control circuitry configured to control the display to display a status menu that includes: an antenna position status that indicates, for the given physical location in which the mobile telephone is located, if the antenna is properly positioned based upon the physical position of the antenna relative to said mobile telephone system to control the display to continually update the antenna position status to be either positive or negative in the status menu in a manner responsive to a physical repositioning of said antenna; a battery power status; and a mobile telephone self-test status.

9. The mobile telephone of claim 8 wherein the status menu includes a memory capacity status.

10. The mobile telephone of claim 8 wherein the status menu includes a car kit status.

11. The mobile telephone of claim 8 wherein the status menu includes a security status.

12. The mobile telephone of claim 8 wherein the status menu comprises a locked/unlocked status.

13. The mobile telephone of claim 8 wherein the mobile telephone is configured to communicate with satellites using the antenna.

14. The mobile telephone of claim 13 wherein the mobile telephone is configured to communicate using code division multiple access spread spectrum signaling.

15. A method for operating a mobile telephone in communication with a mobile telephone system, the method comprising:

simultaneously displaying; one of a positive position status and a negative position status of an antenna; a battery power status; and a mobile telephone self-test status;

repositioning said antenna if said antenna position status is negative; and halting said repositioning once said antenna position status becomes positive.

16. The method of claim 15 further comprising continuously updating said antenna position status during said repositioning.

* * * * *